UNITED STATES PATENT OFFICE.

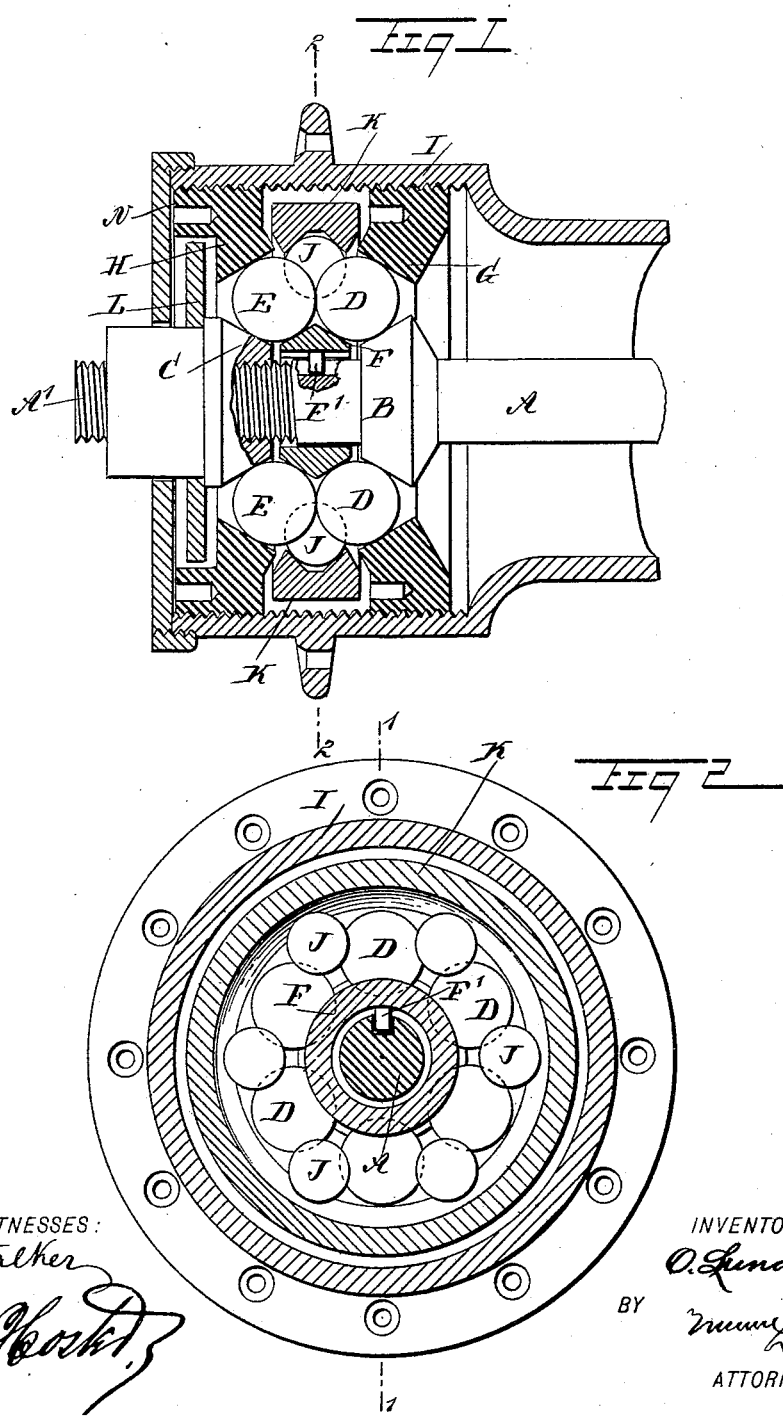

OLE LUNDE, OF ELGIN, ILLINOIS.

BALL-BEARING.

SPECIFICATION forming part of Letters Patent No. 602,705, dated April 19, 1898.

Application filed December 29, 1897. Serial No. 664,274. (No model.)

*To all whom it may concern:*

Be it known that I, OLE LUNDE, of Elgin, in the county of Kane and State of Illinois, have invented a new and Improved Ball-Bearing, of which the following is a full, clear, and exact description.

The object of the invention is to provide a new and improved ball-bearing which is simple and durable in construction, not liable to get out of order, and arranged to reduce friction to a minimum.

The invention consists of novel features and parts and combinations of the same, as will be hereinafter more fully described, and pointed out in the claims.

Reference is to be had to the accompanying drawings, forming a part of this specification, in which similar characters of reference indicate corresponding parts in both the figures.

Figure 1 is a sectional side elevation of the improvement on the line 1 1 of Fig. 2, and Fig. 2 is a cross-section of the same on the line 2 2 of Fig. 1.

The axle A is provided near each end with a fixed collar B and a screw-collar C, screwing on the threaded end A' of said axle A, said collars B and C having bearing-surfaces inclined toward each other for receiving two rows of supporting-balls D and E, respectively arranged alongside each other and kept separate by a bearing-ring F, fitted to slide on the axle, but prevented from lateral movement by a pin F', extending into a longitudinal recess in the axle. The ring F has its outer face made peak-shaped for engaging two rows of balls and keeping the same sufficiently separated to prevent said balls from rolling one upon the other. The ring is free to slide longitudinally on the axle to permit proper adjustment of the various parts hereinafter described.

The rows of balls D and E are engaged at their outer sides by the beveled surfaces of bearings G and H, in the form of rings, screwed or otherwise attached to the hub I of the wheel to be revolved, the bearing-surfaces of the bearings G and H being inclined toward each other, but in opposite directions to the corresponding surfaces of the collars B and C. Separating-balls J engage the rows of balls D and E at their outer surfaces, the said balls J being contained in a ring K, loosely held within the hub I, the bearing-surfaces of the said ring K being inclined toward each other approximately at an angle of forty-five degrees to prevent the balls J from leaving the ring, thus holding the balls between the rows of balls D and E to separate the same and to keep the rows of balls in contact with their bearing-surfaces on the collars B C and bearings G H.

In order to prevent dust from passing into the bearing G, I provide a dust-plate L, fitted over the outer reduced end of the collar C and extending close to a shoulder on the bearing H. A dust-cap N screws on the outer end of the hub I and has an opening for the passage of the reduced end of the collar C, the said dust-cap and its dust-plate L preventing dust from passing to the balls and their bearing-surfaces.

Now it is evident that by the arrangement described the main supporting-balls D and E are kept separate from each other and their corresponding bearing-surfaces by means of the separating-balls J, and consequently friction is reduced to a minimum and the load is equally distributed between the two rows of balls D and E.

Having thus fully described my invention, I claim as new and desire to secure by Letters Patent—

1. The combination of the axle having spaced collars inclined toward each other, a ring slidable upon the axle between the collars yet held to rotate with the axle, the peripheral surface of said ring being inclined at each end toward the adjacent collar, balls engaging the collars and ring, and a hub engaging the outer surfaces of the balls.

2. The combination of the axle having spaced collars inclined toward each other, a ring slidable upon the axle between the collars, and having its peripheral surface inclined at each end toward the adjacent collar, balls engaging the collars and ring, and a hub engaging the outer surfaces of the balls.

3. The combination of the axle having a stationary collar and another collar adjustable longitudinally of the axle, the peripheral surfaces of said collars being inclined toward each other, a ring located between the collars and freely slidable upon the axle longitudinally, the peripheral surface of the ring being inclined at each end toward the adjacent collar, balls engaging the collars and ring, and a hub engaging the outer surfaces of the balls.

OLE LUNDE.

Witnesses:
JOHN VEIBY,
DAVID C. BRANDT.